United States Patent [19]

Ross

[11] Patent Number: 5,066,388
[45] Date of Patent: Nov. 19, 1991

[54] PROCESS AND APPARATUS FOR DISENGAGING AND SEPARATING BITUMEN FROM PULVERIZED TAR SANDS USING SELECTIVE COHESION

[76] Inventor: Lena Ross, 3827 83 Ave., S. E., Mercer Island, Wash. 98040

[21] Appl. No.: 485,462

[22] Filed: Feb. 27, 1990

[51] Int. Cl.$^5$ .......................... B03D 1/24; B03B 5/62; B03B 5/64; C10G 1/00
[52] U.S. Cl. ..................................... 209/170; 241/24; 208/425; 209/11; 209/17; 209/45; 209/46; 209/159; 210/221.2
[58] Field of Search .................... 209/3, 11, 12, 17, 45, 209/46, 158, 159, 160, 161, 169, 170; 208/425; 210/221.1, 221.2; 241/20, 24

[56] References Cited

U.S. PATENT DOCUMENTS

| | | | |
|---|---|---|---|
| 528,803 | 11/1894 | Ramsey | 209/159 |
| 655,125 | 7/1900 | Stalcup | 209/161 |
| 1,128,875 | 2/1915 | Hoover et al. | 209/160 |
| 1,312,754 | 8/1919 | Rowand | 209/170 |
| 1,456,165 | 5/1923 | Whitney | 209/158 |
| 2,823,801 | 2/1958 | Strohl | 209/159 |
| 2,924,565 | 2/1960 | Stegemeier | 208/425 |
| 2,924,566 | 2/1960 | Vaell | 208/425 |
| 2,980,600 | 4/1961 | Kelly | 208/425 |
| 3,246,749 | 4/1966 | Moser | 209/170 |
| 3,250,394 | 5/1966 | Clark | 209/170 |
| 3,271,293 | 9/1966 | Clark | 209/170 |
| 3,295,677 | 1/1967 | Condolios | 209/158 |
| 3,322,272 | 5/1967 | Evans | 209/170 |
| 3,351,195 | 11/1967 | Hukki | 209/158 |
| 3,642,129 | 2/1972 | McDaniel | 209/159 |
| 3,652,466 | 3/1972 | Hittel | 209/158 |
| 3,784,464 | 1/1974 | Kaminsky | 209/169 |
| 4,055,480 | 10/1977 | Smith | 208/425 |
| 4,096,057 | 6/1978 | Porritt | 207/161 |
| 4,416,764 | 11/1983 | Gikis | 209/158 |
| 4,617,113 | 10/1986 | Christopherson | 209/170 |

FOREIGN PATENT DOCUMENTS

| | | | |
|---|---|---|---|
| 25936 | of 1912 | United Kingdom | 209/160 |
| 166278 | 7/1921 | United Kingdom | 209/160 |
| 190060 | 12/1922 | United Kingdom | 209/158 |

Primary Examiner—Stanley S. Silverman
Assistant Examiner—Thomas M. Lithgow
Attorney, Agent, or Firm—M. Reid Russell

[57] ABSTRACT

Process and apparatus for disengaging organic, bituminous material from pulverized bituminous ores and for recovering a concentrated mixture of the bituminous material and water. Wherein the apparatus comprises a pulverizer to pulverize the ores to be processed to particles not larger than ¼ inch in size and inner and outer process vessels which are preferably combined into a unitary assembly and wherein the process comprises a combination of mechanical and hot water disengagement of the organic, bituminous materials from the mineral ore solids, i.e., sand and wherein the disengagement step comprises a high shearing of the mineral solids so as to disengage the bituminous material from the ore and to produce a mixture of disengaged bituminous material, water and mineral ore solids which mixture is then introduced into a body of water so that the bituminous materials and the mineral ore solids will separate into distinct concentrated zones with the bituminous material and the mineral then being recovered separately from the separate zones, with the bituminous material being collected on a colled surface.

13 Claims, 1 Drawing Sheet

PROCESS AND APPARATUS FOR DISENGAGING AND SEPARATING BITUMEN FROM PULVERIZED TAR SANDS USING SELECTIVE COHESION

BACKGROUND OF THE INVENTION

1. Field of the Invention

This invention relates generally to processes and apparatus for disengaging bituminous material from crushed bituminous ores such as crushed tar sands and separating the disengaged bituminous material from the crushed ores.

2. Prior Art

The extraction of bituminous materials from ores containing the bituminous materials has been studied extensively for over half a century. The hot water process is presently being utilized commercially in Canada to recover bitumen from oil sands (sometimes also referred to as tar sands).

In the hot water process, oil sands is mixed with hot water having a slightly alkaline pH. The bitumen associated with the sand is thereby disengaged from the sand and dispersed in the resulting slurry. The slurry is treated to float a bituminous rich, aqueous layer from the slurry, with the bitumen then being recovered from the aqueous mixture.

Efficient separation of bitumen from the crushed mineral ore sands as well as from the aqueous mixture has been plagued with numerous problems, all of which result in reducing the degree of recovery of the bitumen from the mineral ore. A major difficulty experienced in the processing of the tar sand, or oil sand or oil shale has been the variability in the quality of the mineral ores which are being processed. In the commercial hot water process, the recovery of bitumen from oil sands is no greater than about 85% and the recovered bitumen will contain up to 30% inorganic contaminants. The feed ore must be of high grade quality or recoveries are reduced to even lower levels. The lower recoveries create additional problems in addition to the loss of bitumen. Low recoveries lead to substantial amounts of organic contaminants in the tailing streams. The organic contaminants promote formation of suspended solids in the aqueous streams in the form of an emulsion. The settling rates for the suspended solids in the emulsions is poor, and large settling ponds are required. The settling ponds create environmental problems, and the ponds can also cover large areas which could otherwise be used as valuable resource land.

Quality of the mineral ore varies greatly from one location to another and even at different depths in the same deposit. As a general rule, the low grade or ®s have a rather high content of finely divided clay or siliceous material commonly known in the trade as fines. In addition, the low grade ores yield bitumen having high viscosity, and, of course, the bitumen loading or content is low. All of these factors tend to increase the difficulty which is incurred when the low grade ores are processed. Because of the many problems associated with processing the low grade ores, it has generally been thought that the low grade ores were not worth processing. However, there are vast reserves of oil tied up in the low grade ores, and it would be highly desirable and advantageous to be able to economically recover these oil reserves. Of course, any improvement which would aid in recovering bitumen from low grade ores would likely result in improved recoveries for the higher grade ores also.

OBJECTS OF THE INVENTION

A principal object of the present invention is to provide an efficient process and improved apparatus for disengaging and separating bituminous, organic material from bituminous ores such as tar sands. A particular object of the present invention is to provide relatively inexpensive, highly efficient, novel process and apparatus for disengaging and separating bitumen in relatively high yields, even from low grade bituminous ores. A further objects of the present invention is to provide process and apparatus which utilizes minimal amounts of water, with the tailings streams being readily treated for reuse in the process without requiring extensive settling ponds for separating fines from the tailings streams.

A further object of the present invention is to provide process and apparatus in which the bitumen is effectively disengaged from the mineral ore solids through fine pulverizing of the ore, and the disengaged bitumen is separated from the solids in such manner and with a sufficiently short time span to prevent the bitumen from agglomerating and becoming reentrained with the solids of the mineral ore.

An additional object of the present invention is to provide apparatus which is relatively simple in design and which is portable so that the apparatus can be located adjacent to the mining operatings and relocated as desired as the mining operations proceed.

SUMMARY OF THE INVENTION

The above objectives are achieved in accordance with the present invention by providing novel process and apparatus for disengaging and separating bitumen from pulverized bituminous ores. The novel process and apparatus greatly facilitates the disengagement and separation of bitumen from the pulverized bituminous ores. The apparatus provides means for disengaging the bituminous oil from the pulverized bituminous ores, and for efficiently separating the disengaged bituminous oil from the mineral ore solids, i.e., sands.

The disengagement process comprises two main steps. The first step involves a high solids concentration, low shear and fine particle conditioning, and the second step comprises high shear conditioning with a reduced solids concentration. The conditioning in a disengaging chamber includes a combination of efficient mechanical and chemical action to effect essentially total disengagement of the bituminous oil from the pulverized ore.

The ore feed, i.e., tar sands, is first pulverized to a size that the largest particles will be no greater size than about ¼ inch and preferably that will pass through a 10 mesh screen. The ore is initially pulverized in a pulverizing machine that breaks it by impact and without a crushing action that will cause continued engagement of the bituminous material with the non-bituminous material. The ore is reduced to a size capable of passing a No. 10 screen. Such a pulverizer is shown in U.S. Pat. No. 4,796,620 which may have an interior lining of Teflon or the like if necessary to prevent adhesion of the bitumin within the pulverizer. The pulverized ore is fed into a disengaging chamber which is a substantially cylindrical-shaped chamber and which is oriented so that its longitudinal axis is substantially vertical. The disengaging chamber includes baffles extending inwardly from the inside surface of the chamber. The baffles can be annular baffles which are spaced from each other along the length of the disengaging chamber, or the baffles can extend in spaced substantially parallel relationship so as to be generally oriented upwardly along the longitudinal length of the disengaging chamber. A plurality of agitation impellers are positioned within the disengaging chamber, with the impellers being adapted for rotation about axes which are substantially parallel with the longitudinal orientation of the disengaging chamber.

The pulverized ore is fed directly into the disengaging chamber at an upper end thereof. Water and/or steam is added to the pulverizer crushing the ore and is also added to the pulverized ore in the auger feeder to maintain a solids concentration above about 80%. Steam may be injected into the pulverizer to initiate the disengagement process.

Steam and recycled hot water are added to the disengaging chamber, and the pulverized ore is mixed with hot water as the ore is subjected to shear from the mixing impellers. The solids concentration in the disengaging chamber is maintained at from about 40% to 80% and the temperature of the ore mixture within the disengaging chamber is maintained at from about 185 F. to 212 F. The pH of the mixture in the disengaging chamber is maintained slightly alkaline, i.e., between about 7.5 to 9.0. Disengagement of the bituminous oil from the pulverized ore is rapidly achieved as a result of the high shear mixing at the pH and temperature of the mixture. The impellers are designed with upward and downward pitches necessary to effect a total residence time of between about 1 to 10 minutes for the ore mixture within the disengaging chamber.

The mixture of disengaged bituminous oil, water and pulverized ore solids is discharged directly from the bottom of the disengaging chamber to a body of water contained with a surrounding separation vessel. The body of water in the separation vessel is maintained at a temperature of between 165 F. and 190 F. and the mixture from the disengaging chamber is discharged to the body of water in the separation vessel beneath the surface of the body of water.

Ideally, the mixture is discharged to the separation vessel directly from the disengaging chamber with the shortest possible mixture travel. In the preferred form of the invention, the separation vessel is positioned immediately beneath the disengaging chamber and the mixture is discharged from the disengaging chamber directly to the separation vessel. It has been found that the combination of impact pulverization in the pulverizer to obtain the desired particle size the high shear conditions of the disengaging chamber and the pH control and heating of the slurry produces a particularly effective mechanical and chemical action which rapidly and efficiently disengages the bituminous oil from the pulverized ore. It has also been found that continued agitation following the disengagement, including even turbulent transfer of the resultant slurry from the disengaging chamber, however, often forces disengaged bituminous oil into a state of re-engagement with the clay and other solid particles in the pulverized ore. This re-engagement can severely adversely affect the subsequent separation of the bituminous oil from the pulverized ore in the separation vessel. Thus, it is very important that the residence time within the disengaging chamber of the pulverized ore be maintained within the limits set forth herein, and that the material be directly transferred from the pulverizer to the disengaging chamber and then to the separation vessel.

A flow of hot, recycled water is introduced into the bottom portion of the separation vessel. The upwardly directed flow of water aids in separating the bituminous oil from the pulverized ore solids in the separation vessel. The bituminous oil rises to the top portion of the body of water, and the pulverized ore migrates to the bottom portion. The bituminous oil is collected as a concentrated mixture of oil and water with the overflow from the separation vessel and is discharged onto a cooled collector plate, and clean, pulverized ore, substantially free of bituminous, organic material, is removed from the bottom portion of the body of water.

Additional objects and features of the invention will become apparent from the following detailed description and drawings disclosing what are presently contemplated as being the best modes of the invention.

THE DRAWINGS In the drawings:

FIG. 1 is a schematic flow diagram for the process of the invention; and

FIG. 2, a schematic, cross-sectional representation of the presently preferred apparatus of the invention used in practicing the method of the invention.

DETAILED DESCRIPTION Referring now to the drawings:

Figures 1, 2:
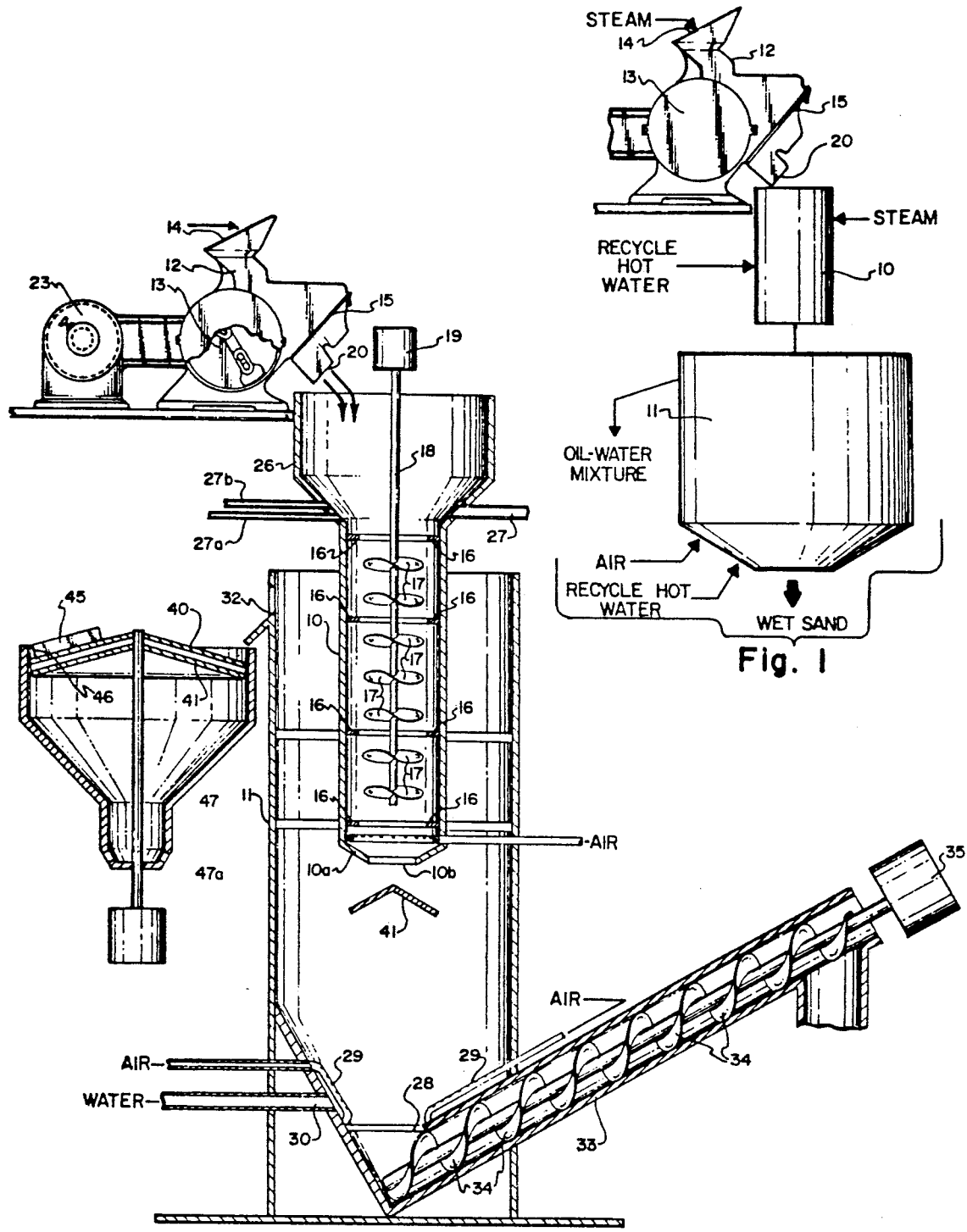

In the recovery of bitumen or oil from oil sands, or tar sands as they are sometimes called, the objective is to recover as high a percentage separation of the bitumen from the starting raw oil sands as possible and to collect or recover a bitumen concentrate which is as free of sand as is possible. Typically, in the recovery of bitumen from oil sands using "the hot water process", the yields of bitumen are in the range of 85% and the recovered bitumen concentrate may contain up to 30% of inorganic components such as sand, silt and clays which are normally found in the ore. In commercial operations utilizing the hot water process for recovering bitumen from tar sands, large tailing streams are produced which contain significant amounts of the bitumen which was present in the original ore. The tailing streams also contain much of the clay which was present in the original ore, and the clay tends to form a dispersion which settles extremely slowly. The tailing streams must, accordingly, be held for prolonged period of time in large ponds before the water is low enough in solids to be reused in the process. This requires very large tailings ponds which are a hazard in nature, especially to wildlife such as wild birds, and the large ponds have the additional objection of covering large areas of lands which are rich in otherwise minable ore.

The present invention provides an improved process and apparatus for disengaging and separating the bitumen from the oil sands. The process of this invention mechanically and chemically separates the bitumen from the clays and sands of the starting ore materials while avoiding re-engagement and reassociation of the disengaged bitumen with the clays and sands of the starting ore material. The bitumen is rapidly and effectively separated from the water streams used in the process. The mineral solids in the tailings streams quickly settle from the streams, with the water then being available almost immediately for reuse in the process. The process thus avoids the need for very large settling ponds which have been such a problem in the commercial hot water process, while achieving an exceptionally high yield of recovered bitumen.

The present process may utilize two major processing steps. The first step provides means for disengagement of the bitumen from the bituminous ore and may use a pulverizer 13 discharging into a disengaging chamber 10. The second step involves separating the disengaged bitumen from the ore solids and may use a separation vessel 11. The process is shown schematically in FIG. 1, and the preferred embodiment of the disengagement and separation apparatus as used in the process is shown in FIG. 2.

The bituminous ore which is to be processed is fed from a storage hopper 12 to the pulverizer 13 which may be one or more of the machines of the impact type disclosed in U.S. Pat. No. 4,796,620, and manufactured by Dynamic American Corporation in Salt Lake City, Utah. It will be apparent, however, that the pulverizer means can be any conventional apparatus that will pulverize the bituminous ore to the necessary less than $\frac{1}{4}$ inch and preferably minus ten mesh size without re-engaging the materials. Steam is introduced into the pulverizer through an inlet means, i.e., nozzle 14 to keep the bituminous material from sticking to the insides of the pulverizer. To insure that particles larger than this size range do not enter the process, a final screening occurs just before the pulverized ore is introduced into the disengaging chamber 10. As shown diagramatically in FIG. 1, the pulverized ore from the pulverizer 13 is discharged through a screen 15 in the pulverizer. Various screening apparatus which are well known and used in the art can also be utilized in the present invention. As is customary with such screen apparatus, oversized particles can be returned to the pulverizer 13 for further disintegration. In any event the pulverized ore, having a particle size no greater than between about $\frac{1}{4}$ inch, passes through and is introduced directly into the disengaging chamber 10.

Hot water is also added to the disengaging chamber 10 with the pulverized ore, and the pulverized ore and hot water are mixed together in the disengaging chamber 10 under high shear and at a solids concentration of from about 40% to 80%. The temperature of the mixture within the disengaging chamber is maintained between about 185 F. and 212 F. Caustic soda is added to the hot water feed to the disengaging chamber 10 as needed to maintain a pH of between about 7.5 and 9.0 for the mixture within the disengaging chamber 10. The disgestion conditions within the disengaging chamber 10 combine an efficient mechanical and chemical action to effect a rapid, effective disengagement of the bituminous oil or bitumen from the pulverized ore solids. Continued agitation of the mixture of disengaged bitumen, water and pulverized ore beyond the time necessary to effect disengagement, however, has a tendency to cause re-engagement of the disengaged bitumen with ore solids wherein final separation of the oil from the sand is curtailed. Excessive mechanical agitation may further cause intimate mixing of bitumen and fines which results in an extremely viscous mixture that is very difficult to separate from the pulverized ore solids. In order to substantially prevent the re-engagement phenomena from occurring, it has been found that the flow rate of the water and pulverized ore through the disengaging chamber 10 should be maintained such that the residence time of the pulverized ore within the disengaging chamber 10, i.e., the length of time that the pulverized ore and water are subjected to mixing within the disengaging chamber 10, is long enough to allow the heat transfer, mechanical shearing and chemical action to take place but sufficiently short to prevent bitumen agglomeration and re-entrainment of solids. Residence times have been found to be preferably within the range of from about one minute to ten minutes.

The mixture of pulverized ore, water and disengaged, bituminous material is discharged from the disengaging chamber 10 to a body of water contained within the separation vessel 11. Subsequent transfer of the mixture from the disengaging chamber 10 through pipes, conduits, bends or baffles also tends to force the disengaged particles of bituminous material into a state of re-engagement with the ore solids in a manner similar to excessive mixing time in the disengaging chamber 10. Thus, the mixture is transferred directly from the disengaging chamber 10 directly and immediately to the body of water in the separation vessel 11, rather than transferring the mixture through a piping or conduit system. If it is necessary that a piping or conduit system be used, it should be maintained as short as possible and with a minimum of turns or bends in the system.

The mixture of disengaged bituminous material, water and pulverized ore solids is separated into separate zones within the separator vessel 11. The mixture of disengaged bituminous material, water and pulverized ore solids is discharged from the disengaging chamber 10 directly to the body of water within the separation vessel 11, with the mixture being introduced into the body of water at a point beneath the surface of the body of water, which body of water is maintained at a temperature of between about 165 F. and 190 F.

The disengaged, bituminous material in the mixture is allowed to rise to the top portion of the body of water in the separation vessel 11, with the pulverized ore solids migrating to the bottom portion of the body of water. A concentrated layer of bituminous material is thus formed at the top portion of the body of water. The layer of concentrated bituminous material is separated from a slurry of pulverized ore solids and water at the bottom portion of the body of water by an intermediate portion of the body of water into which the mixture from the disengaging chamber is discharged and through which the bituminous material and ore solids migrate in opposite directions.

A sufficient flow of water is introduced into the bottom portion of the separation vessel so as to produce a general upward movement of water within the separation vessel 11 of between about 1 centimeter per minute to about 100 centimeters per minute. The upward directed flow of water into the bottom portion of the separation vessel 11 is adapted to substantially fluidize the pulverized ore without impairing the downward migration of the ore solids within the separation vessel 11. The upward flow of water within the separation vessel is also adapted to aid in separating residual, disengaged bituminous material from the pulverized ore which is migrating to the bottom of the body of water in the separation vessel 11.

The upward flow of water in the separator vessel 11 also enhances or aids the flotation of the bituminous material to the top of the separation vessel 11, as well as assisting in collecting and removing the concentrated bituminous material from the top of the separation vessel 11. The latter function is conveniently achieved by collecting the bituminous material with the overflow water as an overflow from the top of the separation vessel 11 and directing it onto a rotating cooled surface 40.

Clean, pulverized ore, substantially free of bituminous organic material, is removed from the bottom portion of the body of water by an auger or a slurry pump. Excess water is removed from the slurry of ore solids, and the recovered water is reused in the process. The overflow from the separation vessel is also treated to remove the bituminous material therefrom, and the water recovered therefrom is also recylced and reused in the process.

In the preferred embodiment of the process as illustrated schematically in FIG. 1, steam is added at 14 to the pulverized ore as the pulverized ore passes through the disengagement vessel 11. A flow of air can also be introduced into either or both the disengaging chamber 10 and the separation vessel 11. In the disengaging chamber 10, the flow of air assists in disengaging and separating the bituminous material from the pulverized ore solids, and in the separation vessel, the flow of air assists in maintaining separation of the particles of bituminous material from the sand and in floating the bituminous material to the top of the body of water.

The disengaging chamber 10 is preferably a substantially cylindrical-shaped chamber which is oriented so that its longitudinal axis is substantially vertical. As shown in FIG. 2, the disengaging chamber 10 contains at least two annular baffles 16 which extend inwardly from the inside surface of the disengaging chamber 10 and which are spaced from each other along the longitudinal length of the disengaging chamber 10. As shown in FIG. 2, four annular baffles 16 are utilized, with one baffle being located at the top of the vessel 10, another being located at substantially the bottom of the vessel 10 and two intermediate baffles being spaced apart between the top and bottom of the vessel 10. The annular baffles 16 shown in FIG. 2, substantially divide the chamber 10 into three subchambers. The two intermediate baffles can be spaced further apart from each other than each is from its respective end baffle. This results in the central subchamber being slightly larger than either of the subchambers on top and below the central subchamber.

A plurality of agitation impellers 17 are positioned within the disengaging chamber 10 so that at least one impeller is situated between each and any adjacent pair of annular baffles 16. As illustrated, the respective adjacent pairs of baffles divide the vessel into three subchambers and the impellers 17 are positioned so that two impellers 17 are positioned in the first or top subchamber, three impellers 17 in the intermediate subchamber, and two impellers 17 in the lower subchamber. The impellers 17 are mounted for rotation about axes which are substantially parallel with the longitudinal orientation of the disengagement vessel 10. As shown, the impellers 17 are mounted on a common drive shaft 18, and the drive shaft 18 is positioned substantially coaxial with the longitudinal axis of the disengaging chamber 10. The impellers 17 may have an outer diameter just slightly less than the inner open diameter of the annular baffles 16 so that the shaft 18 and impellers can be positioned within and withdrawn from the end of the chamber 10. More than one drive shaft, with more or fewer impellers on each drive shaft may be used.

In the preferred embodiment of the invention, three or four subchambers are formed in the disengaging chamber 10, with two or three impellers positioned within each subchamber. To achieve the desired shearing action in the disengaging chamber 10, the impellers are driven such that the top speed of the outer edge of each impeller is from about 250 to 1,000 feet per minute. As shown in FIG. 2, the impellers mounted on a single drive shaft 18 are driven by an appropriate drive means or motor 19 mounted on the end of the shaft 18 which extends from above the disengaging chamber 10.

Means are provided for introducing a mixture of pulverized bituminous ores and water into the disengaging chamber 10. As illustrated in FIG. 2, a preferred means for introducing the mixture of pulverized ores and water into the disengaging chamber 10 comprises the pulverizer 13 having a discharge chute 20. The feed hopper 12 is arranged such that pulverized bituminous ore is fed to the pulverizer 13 by gravity and after the ore is pulverized it is discharged through chute 20 into the open upper end of the disengaging chamber 10. The pulverizer 13 is driven by an appropriate motor or drive means 23. The inlet nozzle means 14 is provided into the feed hopper 12 for introducing steam into the ores being pulverized by the pulverizer 13. The steam is introduced to the pulverizer through the nozzle means 14 directed into the hopper 12. The steam provides moisture for mixing with the pulverized ore within the pulverizer 13 and for heating the pulverized ore as it moves through the pulverizer 13. The rate of steam feed to the pulverizer is preferably between about 0.01 and 0.5 pounds per pound of ore being fed through the pulverizer 13. The pulverization of the moist pulverized ores in the pulverizer 13 initiates the disengagement of the bituminous material from the pulverized ores. The impact pulverization in the pulverizer 13 is under high shear high solids concentration, with the solids concentration being generally greater than about 80%. The residence time for the pulverized ore to pass through the pulverizer is not critical. However, with a pulverizer of the type disclosed in U.S. Pat. No. 4,796,620, the residence time is very short, with pulverization occurring in a matter of seconds and with the pulverized material being forcefully fed into the disengaging chamber.

As shown in FIG. 2, the pulverizer 13 preferably feeds the pulverized ore to the upper end of the disengaging chamber, but it may also feed into the intermediate subchamber. The impellers 17 are designed such that some have an upward pitch and some have downward pitch. The force of gravity and the downward pitched impellers produce a resultant downward flow of the aqueous mixture of pulverized ore through the disengaging chamber 10. Means are provided at the bottom of the disengaging chamber 10 for discharging the aqueous mixture of disengaged bituminous material and sand from chamber 10. The means for discharging the aqueous mixture from the chamber 10 may simply be an open bottom designed to allow the mixture to fall from the chamber 10 as the mixture flows downwardly against the upward lift of the impellers. As illustrated, a conical bottom 10a may be provided for the chamber 10, with an opening being disposed in the conical bottom, and with the opening being substantially concentric with the longitudinal axis of the chamber 10. Generally, the opening in the concentric bottom will have a diameter no greater than about the diameter of the openings created by the annular baffles 16. In practice, however, the discharge opening from the chamber 10 will be sized to cooperate with the pulverizer 13, impellers 17 and annular baffles 16 to produce the desired residence time for the aqueous mixture of sand as it passes through the disengaging chamber 10.

A surge tank or hopper 26 is advantageously provided at the otherwise open top of the disengaging chamber 10. The surge tank 26 is in flow communication and immediately above the chamber 10 so that any transient upward surges of aqueous mixture within the vessel 10 will be contained within the surge tank 26.

Means are also advantageously provided for introducing water, steam and air into the disengaging chamber 10. Such means may comprise nozzles 27, 27a and 27b for the water, steam and air respectively, opening into either the top of the chamber 10 or the surge tank 26. Water and steam are added to the disengaging chamber 10 in amounts such that the solids concentration of the pulverized ore in the mixture in the chamber 10 is maintained between about 40% and 80%. The water which is added to the disengaging chamber 10 is heated to a temperature sufficient so that together with the steam which is added to pulverizer 13 and to the chamber 10, the temperature of the mixture within the chamber is maintained from about 185 F. to 212 F., and preferably greater than 195 F. Air may be introduced into the chamber 10 to further aid in the disengagement and separation of the bituminous material from the pulverized ore. The desirability of air addition and the amounts to be added must be determined experimentally for the particular ore which is being processed. As a general rule, however, it has been found advantageous to introduce from about 50 to 200 liter of air per ton of pulverized ore being treated in the disengaging chamber 10.

Caustic soda is added to the water as necessary to maintain a pH of the mixture within the disengaging chamber within the range of about 7.5 to 9.0.

The slurry or mixture of disengaged bituminous material, pulverized ore and water moves downwardly through the disengaging chamber 10 as described above to be discharged from the lower end of the chamber after a total residence time of from one to ten minutes. Larger particles of ore which are introduced into the chamber 10 will be impacted into the outer baffle area around the impellers 17 due to their larger mass by a centrifugal component of the agitation imparted by the impellers 17. The larger particles will thus naturally have a somewhat larger residence time than smaller particles to promote complete digestion of the larger particles.

A separation vessel 11 is positioned around and immediately below the discharge means at the bottom of the disengaging chamber 10. Preferably, the sidewall of the separation vessel 11, as shown in FIG. 2, extends upwardly from the level of the discharge means on the disengaging chamber 10 such that when the separation vessel 11 is filled with water to its operating level, the discharge means on the disengaging chamber 10 is beneath the surface of the water in the separation vessel 11. A cone-shaped, deflector distributor 41 is preferably provided immediately below the discharge means on the disengaging chamber 10, such that the aqueous slurry or mixture which is discharged from the chamber 10 falls into contact with the deflector distributor 41. The slurry or mixture is deflected radially outwardly and distributed within the body of water in the separation vessel 11.

Means are provided for introducing countercurrent air and water into the separation vessel 11 adjacent to or at the bottom of the separation vessel 11. The amount of water introduced into the separation vessel 11 are the same as has been given above. The desirability of air addition and the amounts of air to be added to the separation vessel 11 must be determined experimentally for the particular ore which is being processed. As a general rule, however, it has been found advantageous to introduce air into the separation vessel 11 in an amount from about 80 to 40,000 liters of air per ton of pulverized ore being treated in the separation vessel 11.

As illustrated in FIG. 2, the bottom of the separation vessel 11 may be of generally conical shape. Sparger means 29 may be provided on the conical bottom for the introduction of countercurrent air into the vessel. A nozzle 30 is also provided to open into the conical bottom for introducing countercurrent water into the vessel. The upward flow of water and air into the separation vessel helps to fluidizes the ore solids which migrate downwardly in the separation vessel, after moving over and past a cone-shaped deflector 41 positioned adjacent to the discharge end of the disengaging chamber and between the lower end of the disengaging chamber and the bottom ,of separation vessel 11. The collected solids which settle to the bottom of vessel 11 are discharged by auger 34 through flow channel 33. The auger is powered by motor 35.

As the slurry or mixture of disengaged bituminous material, pulverized ore and water is discharged into the body of water in the separation vessel, further separation of the bituminous material and the pulverized ore solids begins. The separation is enhanced by the effect of dilution in the body of water in the separation vessel. Rapid dilution is achieved by the deflection and distribution of the sand mixture by the cone-shaped deflector distributor 41. As used throughout the specification and claims, the term "cone-shaped" as refers to the deflector distributor is meant to include any generally disc or dome shaped element. The deflector distributor is advantageously of a conical shape, but the term "cone-shaped" is specifically meant to include a domed, pyramid shape formed by planar members as well as other domed shapes. The individual sand particles begin to settle rapidly due to their relative high mass, while the disengaged bituminous material contacts the dispersed air bubbles which are rising in the body of water. The air bubbles attach themselves to the disengaged particles of bituminous materials and float the bituminous material to the top of the body of water in the separation vessel 11.

The body of water in the separation vessel 11 is maintained at a slightly cooler temperature than that of the sand mixture being discharged from the disengaging chamber 10. The water temperature in the separation vessel 11 is preferably maintained between about 180 F. to 185 F. The cooler temperature of the body of water in the separation vessel initiates agglomeration of the particles of bituminous material, and the agglomeration is further enhanced by the physical contact between particles of the bituminous material as they meet at the top of the body of water in the separation vessel 11. The floating bituminous material is further cooled as it is exposed to essentially atmospheric conditions at the top of the separation vessel 11. The separation vessel 11 can in fact be open to the atmosphere at its top if so desired.

A launder or overflow means 32 is provided near the top of the separation vessel 11. The overflow means 32 comprises an opening in the sidewall of the separation vessel and an overflow collection or drainage means. The overflow means 32 maintains a constant level for the body of water in the separation vessel 11, with the bituminous material being carried with the overflow of water from the separation vessel. The bituminous material is further separated from the overflow water through discharge from the overflow onto a rotating collector, here shown as a cone-shaped plate 40 that is cooled by the circulation of a cooling medium into a chamber 41 formed beneath the plate. The cooling medium is used to maintain the surface of the plate receiving the bituminous material at from −5 C. to 50 C. and preferably within the range of 0 C. to 25 C. It has been found that with the process as heretofore disclosed and using the apparatus described a newly 100% recovery of bitumin is obtained with the last contained sand separating from the bitumen on the plate 40. With this selective cohesion, the bitumen adheres to the plate while the sands and water separate and fall therefrom.

A scraper 45 engages the top surface of plate 40 as the plate turns to collect the material adhering to the plate and to direct it into a trough 46, through which it is directed to any desired collection vessel. The solids and liquids falling from plate 40 are collected in tank 47, which has a conical bottom to direct material into an auger housing. The auger in the housing then discharges the collected materials to any desired collection vessel or receiving area.

Although a preferred form of my invention has been herein disclosed, it is to be understood that the present disclosure is by way of example and that variations are possible without departing from the subject matter coming within the scope of the following claims, which subject matter I regard as my invention.

I claim:

1. Apparatus for disengaging bituminous material from bituminous ores said apparatus comprising a disengaging chamber means oriented to have a substantially vertical central axis;

means for introducing a mixture of pulverized bituminous ores and water into the disengaging chamber means at an upper end thereof;

means in the disengaging chamber means to agitate the mixture introduced thereinto;

a discharge opening through the lower end of the disengaging chamber means;

a separation vessel receiving the lower end of the disengaging chamber means, said separation vessel having a sidewall extending upwardly to a location above the level of the discharge opening of the disengaging chamber means and having a portion tapered inwardly at a lower end thereof at a level below the said discharge opening;

a deflector distributor means positioned beneath the discharge opening and directing flow from the discharge opening outwardly and downwardly toward the sidewall of the separation vessel;

means for introducing upwardly flowing water into the separation vessel adjacent to the tapered bottom thereof;

an overflow means extending through the sidewall of the separation vessel above the level of the discharge opening;

hopper means containing a plate means having an upper surface which slopes outwardly and downwardly from a central apex, with means to rotate said plate means, said hopper means being positioned to receive said overflow from the overflow means on said rotating plate means, means to maintain the surface receiving overflow at a temperature of between −5 C. and 50° C.;

means to remove adhering bituminous material from the plate means; and means for removing collected solids from the lower end of the separation vessel.

2. Apparatus as in claim 1, wherein the means to maintain the surface receiving overflow temperature maintains that temperature at between 0 C. and 25 C.

3. Apparatus as in claim 1, wherein the means in the disengaging chamber means to agitate the mixture introduced therein comprises a plurality of spaced apart baffle means arranged on the interior surface of the sidewall of the chamber means; and impeller means extending into the disengaging chamber means and with at least one impeller situated between each pair of baffle means.

4. Apparatus as in claim 3, wherein the means for introducing a mixture of pulverized bituminous ores and water into the disengaging chamber means comprises an impact pulverizer discharging into said disengaging chamber means. vessel.

5. Apparatus as in claim 4, further including means to introduce steam into the impact pulverizer.

6. Apparatus as in claim 5, further including means to introduce steam, hot water and air into the disengaging chamber means.

7. Apparatus as in claim 6, further including means to introduce air into the disengaging chamber means at the bottom thereof.

8. Apparatus as in claim 3, further including screen means through which the pulverized material is passed before discharge into the disengaging chamber means.

9. Apparatus as in claim 8, wherein the means for removing collected solids comprises a flow channel.

10. Apparatus as in claim 9, wherein the flow channel comprises an auger.

11. Apparatus as in claim 1, further including screen means through which the pulverized material is passed before discharge into the disengaging chamber means.

12. Apparatus as in claim 11, wherein the means to maintain the surface receiving overflow temperature maintains that temperature at between 0 C. and 25 C.

13. Apparatus as in claim 12, wherein the means in the disengaging chamber means to agitate the mixture introduced therein comprises a plurality of spaced apart baffle means arranged on the interior surface of the sidewall of the chamber means; and impeller means extending into the disengaging chamber means and with at least one impeller situated between each pair of baffle means.

* * * * *